(12) United States Patent
Volz et al.

(10) Patent No.: US 6,375,247 B1
(45) Date of Patent: Apr. 23, 2002

(54) BODY OF A MOTOR VEHICLE WITH A SEAT MODULE

(75) Inventors: Reimer Volz, Russelsheim; Reinhard Goy, Kaiserslautern, both of (DE)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 09/804,405

(22) Filed: Mar. 12, 2001

(30) Foreign Application Priority Data

Apr. 13, 2000 (DE) ......................................... 100 18 407

(51) Int. Cl.[7] ................................................. B60N 2/02
(52) U.S. Cl. .......................... 296/66; 296/204; 296/197; 296/65.1
(58) Field of Search ........................ 296/66, 204, 197, 296/65.02, 63, 37.8; 280/730.2, 728.2

(56) References Cited

U.S. PATENT DOCUMENTS

| | | | | |
|---|---|---|---|---|
| 4,900,083 A | * | 2/1990 | Kumasaka et al. | 296/197 |
| 4,914,802 A | * | 4/1990 | Takao et al. | 296/197 |
| 5,352,011 A | * | 10/1994 | Kihara et al. | 296/204 |
| 5,443,239 A | * | 8/1995 | Laporte | 296/65.1 |
| 5,476,303 A | * | 12/1995 | Sakamoto et al. | 296/204 |
| 5,567,005 A | * | 10/1996 | Kosuge et al. | 296/204 |
| 5,704,644 A | * | 1/1998 | Jaggi | 296/204 |
| 5,921,618 A | * | 7/1999 | Mori et al. | 296/204 |
| 6,007,145 A | * | 12/1999 | Tezuka | 296/204 |
| 6,045,174 A | * | 4/2000 | Brancaleone et al. | 296/204 |
| 6,129,412 A | * | 10/2000 | Tanuma | 296/204 |
| 6,206,466 B1 | * | 3/2001 | Komatsu | 297/216.13 |
| 6,270,153 B1 | * | 8/2001 | Toyao et al. | 296/204 |
| 6,276,477 B1 | * | 8/2001 | Ida | 296/197 |
| 6,279,981 B1 | * | 8/2001 | Mesnage | 296/65.03 |
| 6,312,037 B1 | * | 11/2001 | Garrido et al. | 296/65.13 |
| 2001/0019216 A1 | * | 9/2001 | Kobayashi | 296/204 |
| 2001/0030450 A1 | * | 10/2001 | Miyasaka | 296/204 |

FOREIGN PATENT DOCUMENTS

| | | |
|---|---|---|
| DE | 4228120 A1 | 3/1994 |
| DE | 4124627 C2 | 9/1995 |
| DE | 19743313 C1 | 12/1998 |
| EP | 0722859 A1 | 7/1996 |
| JP | 63 235174 | * 9/1988 |

* cited by examiner

*Primary Examiner*—Ken Patel
(74) *Attorney, Agent, or Firm*—Laura C. Hargitt

(57) ABSTRACT

The invention concerns a body of a motor vehicle with at least one seat module. The purpose of the invention is to simplify the assembly of the seats in the body and at the same time to reinforce the body. For this purpose it is proposed that the seat module include a floor part, at least one seat, the seat adjusting elements, the seat covering parts, the electrical wires connected to the seat and a floor covering and that it be preassembled outside of the body. The floor part has supporting edges at its periphery which are supported in adhesive channels on the load-bearing structure of the body. The seat module is inserted as a prefabricated unit into the load-bearing structure of the body in such a way that the floor part in the region of the seat module forms a double floor with the vehicle floor of the body.

8 Claims, 4 Drawing Sheets

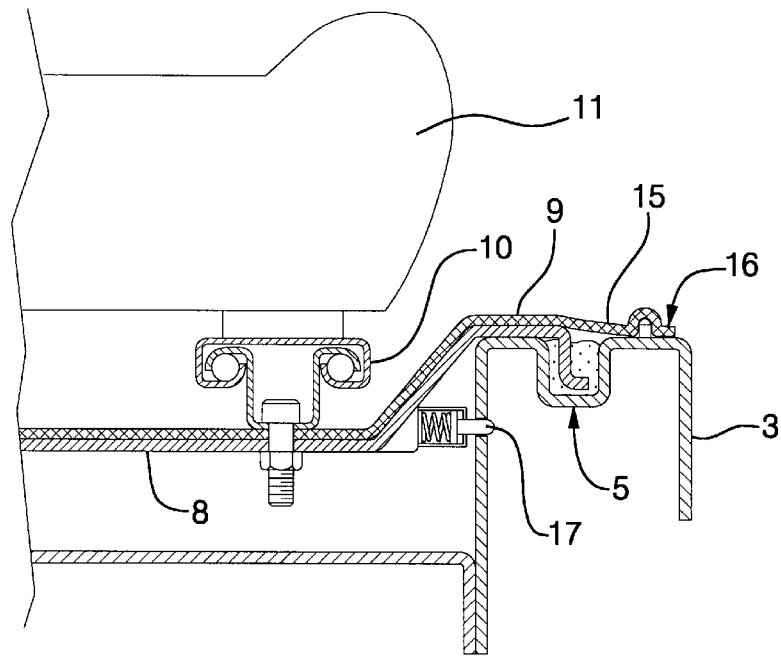
FIG. 6
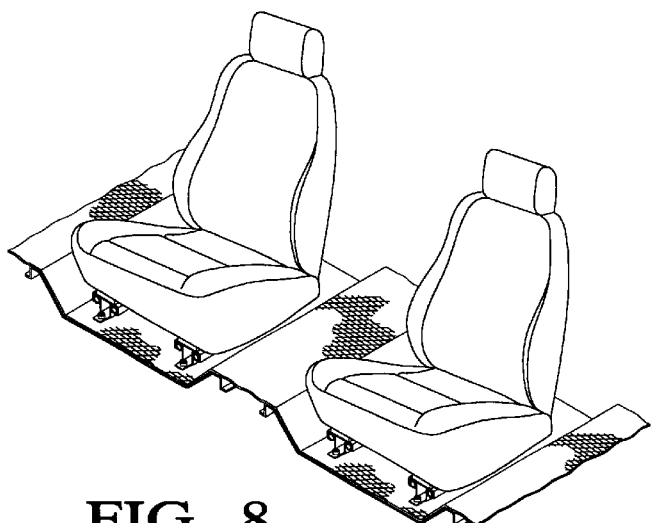
FIG. 8
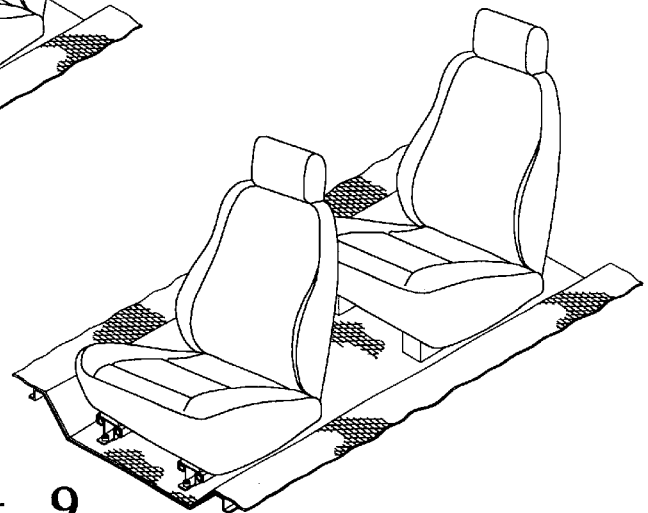
FIG. 7
FIG. 9

BODY OF A MOTOR VEHICLE WITH A SEAT MODULE

TECHNICAL FIELD

The invention concerns a motor vehicle body with at least one seat module.

BACKGROUND OF THE INVENTION

The invention concerns a motor vehicle body with at least one seat module.

DE 42 28 120 A1 describes a motor vehicle whose structure is made up of modules. In this case it is proposed that a front module which also includes the front chassis and operating systems together with the front seat be preassembled completely outside of the vehicle. This front module is then connected to the passenger compartment by means of adhered edges running along the limiting edge of the passenger compartment and its outer side edges in addition to supported fixation points.

By such a mode of construction in addition to the combination of all front assemblies of the vehicle in a separately assembled module it is also achieved that this module in combination with the passenger compartment assumes load-bearing functions. A seat module which especially reinforces the vehicle is not envisaged.

DE 197 43 313 C1 describes a seat module for a transportation means which displays a seat, a seat guide and an electrical installation located in the seat, the electrical connections between the installation and an electrical control unit outside of the seat are made through an inductive transmitter whose primary winding is connected to the seat guide whose secondary winding is connected to the seat.

With this arrangement the seat can be removed from the seat guide and disassembled without having to remove the cable. Therefore no effect on the strength or stiffness of the vehicle is achieved.

EP 0 722 859 A describes a cassette-like rollover protection device module. For reducing the assembly time on the vehicle assembly line and for the possibility of verifying the function outside of the vehicle it is envisaged that the holder and at least the structural parts of the rollover safety device are brought together to form a pre-cabled functional module manufactured outside the vehicle. No mention of seat installation can be perceived in this case.

SUMMARY OF THE INVENTION

The objective of the present invention is to devise a body for a motor vehicle with a seat module which is capable of reducing the assembly time on the vehicle assembly line and makes it possible to verify the functions outside of the vehicle and which in the assembled state in the body contributes to a significant stiffening of the body.

Since the seat module is constructed as a functional module on a part of the floor which is connected on its peripheral supporting edge at the time of assembly firmly to the load-bearing structure of the body and forms in the region of the seat module a double floor on the body, in addition to the advantage of the seat construction, its cabling, and the possibility of functional testing of all seat functions outside of the vehicle, a considerable stiffening of the vehicle body is achieved. In this way positive effects are achieved on the driving properties of the vehicle.

Since the double floor formed by the floor part of the seat module extends directly in the region of the vehicle occupant located on the seat in question, an additional advantage arises since the double floor displays an elevated deformation resistance in the longitudinal direction of the vehicle and especially in the transverse direction of the vehicle.

An especially simple and elegant coverage of the adhesive channel is achieved by the fact that the floor covering applied to the floor part during the assembly of the seat module outside of the vehicle extends sufficiently beyond the edge of the floor part that after insertion of the supporting edge in the adhesive channel on the load-bearing structure the region of the adhesion channel is covered by it. The edge of the floor covering can then be held on the load-bearing structure by known methods by a strip of metal or plastic. The floor covering itself advantageously consists of the covering material used in general in the vehicle, therefore a carpet, a plastic mat or the like.

In order for the seat module to occupy a defined position when assembled in the load-bearing structure of the body is installed inside of the adhesive channel even before the curing of the adhesive, centering elements are provided on the supporting edge which center the supporting edge relative to the adhesive channel. As centering elements, for example, one can use wavelike deformations or alternately pressed through nipples on the supporting edge as described in DE 41 24 627 C2.

As supporting elements, however, one can also provide spring-loaded pegs on the seat module which engage the corresponding openings on the load-bearing structure when the seat module is installed.

The electrical wires laid in the seat module which, for example, are necessary for operation and control of adjustment of the seat positioned on it or for heating the seat are already guided into a common plugging connector outside of the vehicle during the production of the seat module, on which a corresponding socket can be fitted in the vehicle.

The seat or seats of a seat module are detachably affixed to the floor part. Therefore the seats can be removed and reinstalled when required even when the floor part is permanently fixed in the vehicle.

For each adjustable seat in the vehicle preferably a special seat module is provided. However, it is in accordance with the invention if a seat module carries several seats. In this case it may be advantageous to arrange the seats of one row of seats, therefore, for example, two front seats, on a common seat module. It is also equally possible to arrange two seats located one behind the other in the vehicle on a common seat module.

BRIEF DESCRIPTION OF THE DRAWINGS

Examples of embodiment of the invention are described below with reference to the drawings. The drawings show:

FIG. 6: The side of the seat module resting on the load-bearing structure of the body in cross section, FIGS. 7–9: Various configurations of a seat module.

DESCRIPTION OF THE PREFERRED EMBODIMENT

Figure 1:
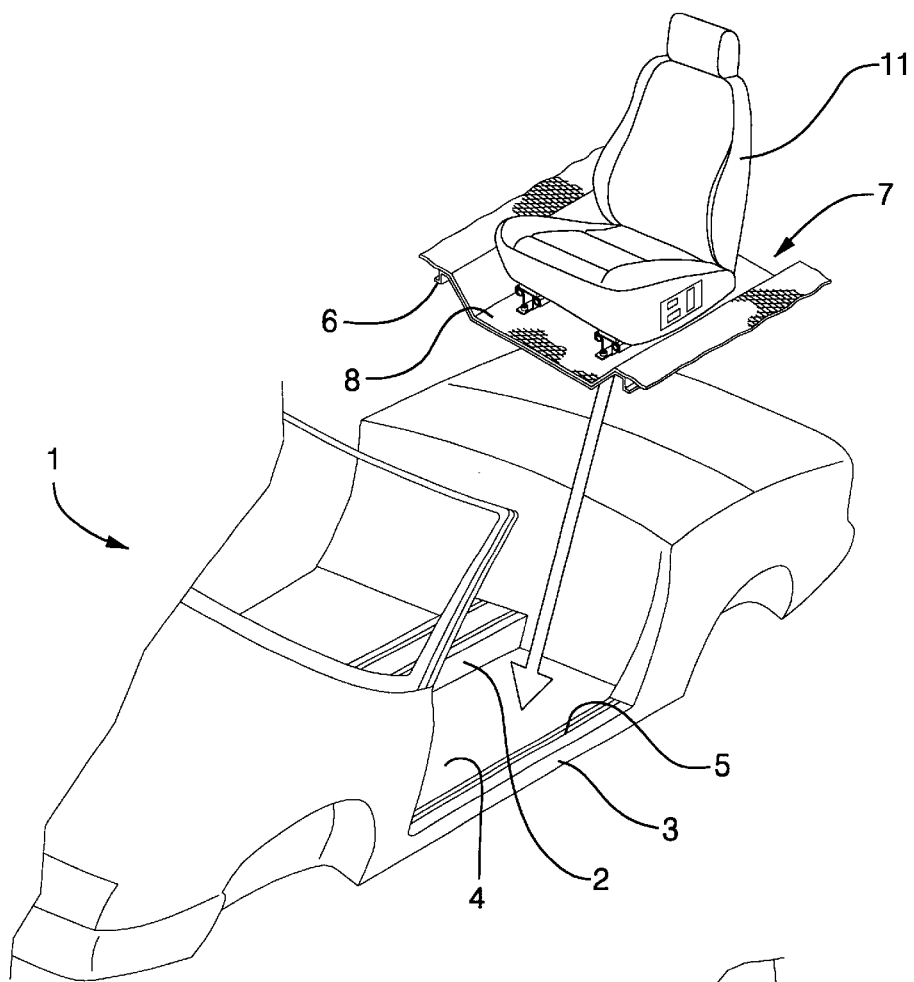
FIG. 1: The body of a motor vehicle with a seat module prepared for installation.
Figure 2:
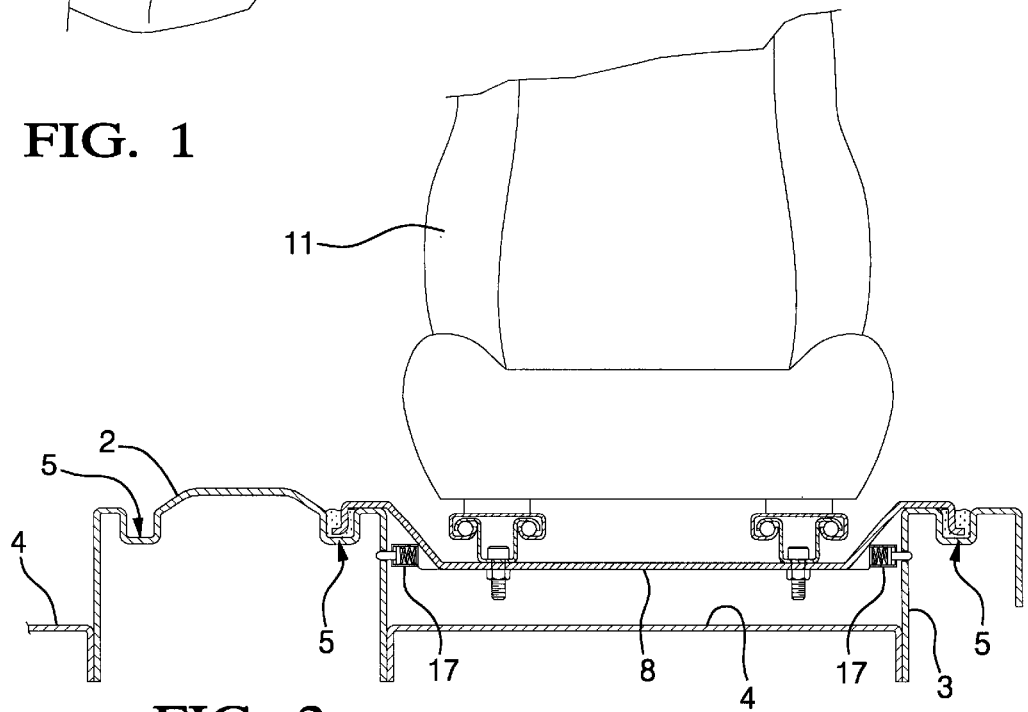
FIG. 2: A section through the load-bearing structure of the floor assembly of a vehicle body with the seat module in place.
Figure 3:
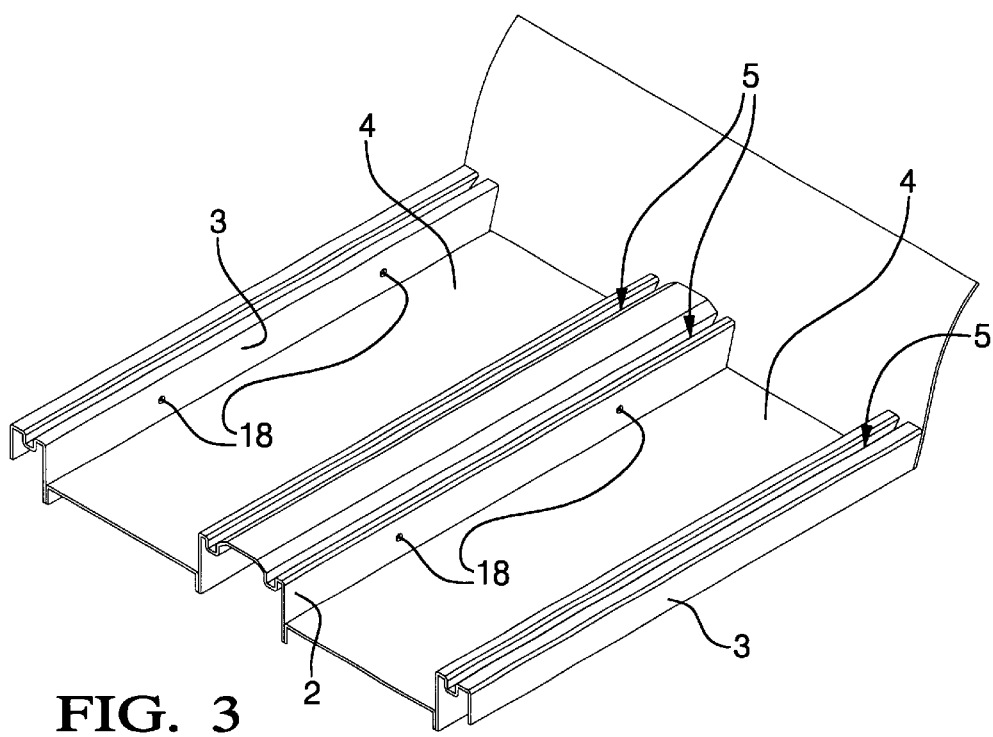
FIG. 3: A perspective view of a section through the load-bearing structure of a floor covering of a body.
Figure 4:
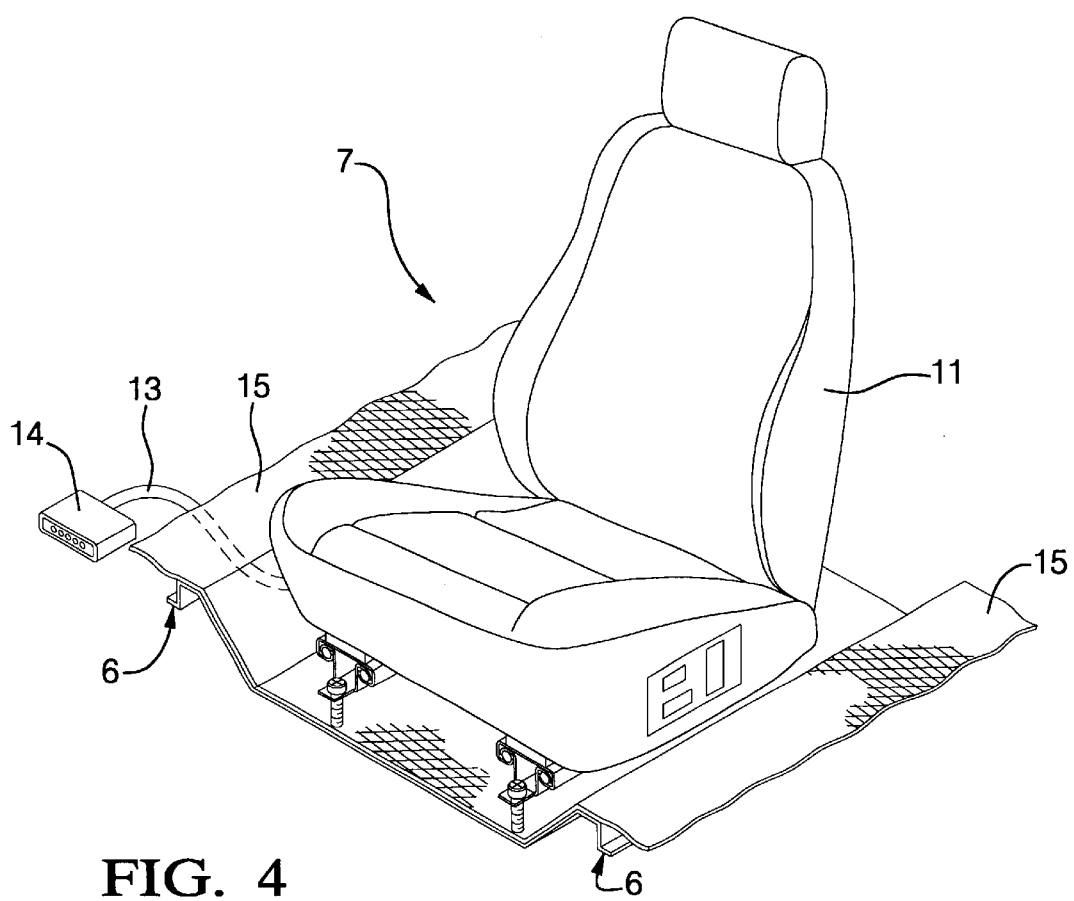
FIG. 4: A seat module for installation in a body.
Figure 5:
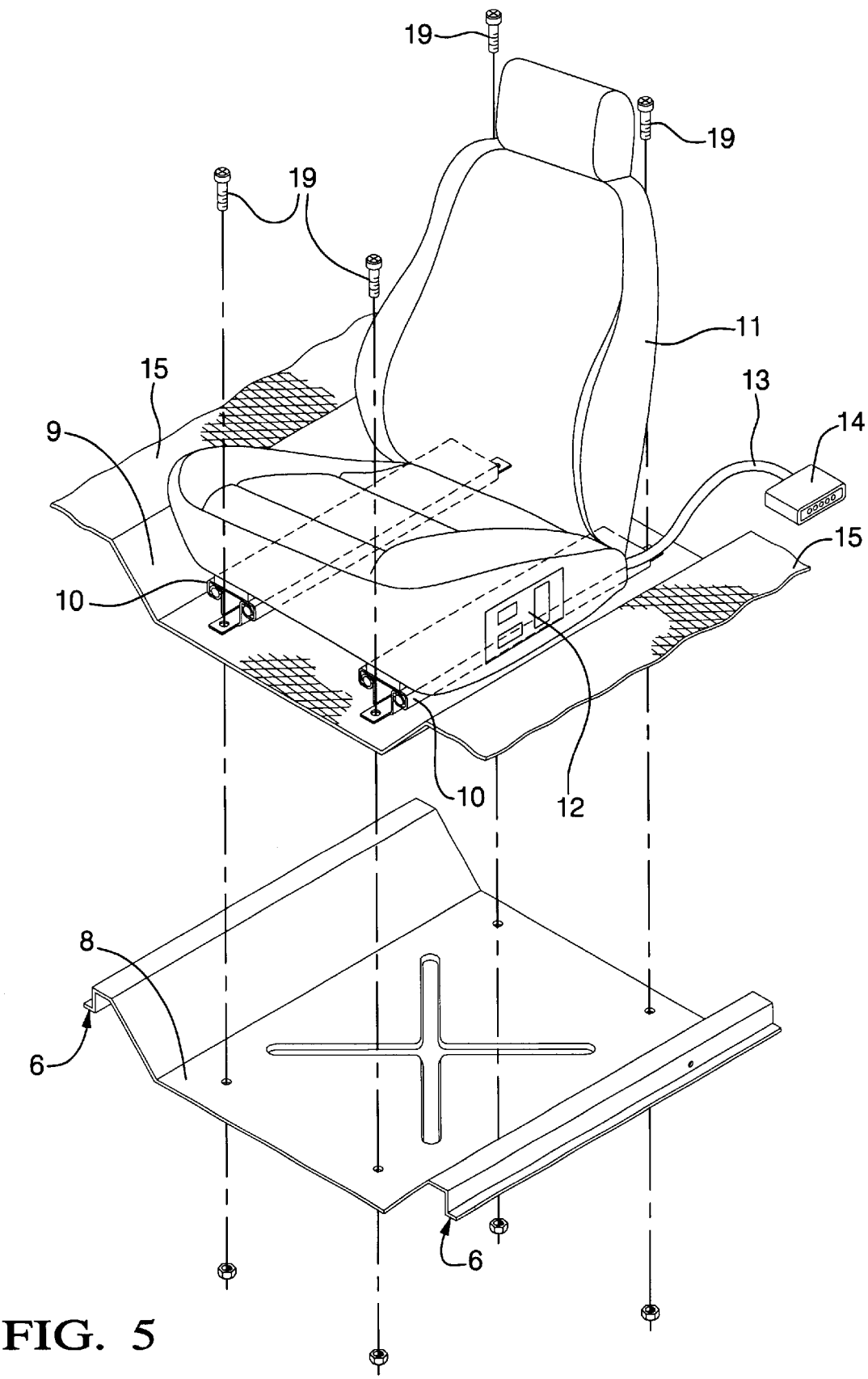
FIG. 5: The essential components of the seat module in FIG. 4 in an exploded view.

A body 1 of a motor vehicle is provided with a load-bearing structure to which a longitudinal member 2 and side members 3 belong. Below the load-bearing structure the body 1 is closed by a vehicle floor 4. The longitudinal member 2 and the side members 3 are provided with adhesive channels of u-shaped cross section open at the top. In each case in one adhesive channel 5 of the longitudinal member 2 and one of the cross members 3 a supporting edge 6 of a floor portion 8 belonging to a seat module 7 is inserted and held by adhesive.

The floor portion 8 of the seat module 7 is covered with a floor covering 9 in the form of carpet and connected to seat rails 10 on which a seat 11 is arranged capable of sliding and locking with its adjusting devices and corresponding switches 12. The electrical drives of the adjusting devices, the sensors present in the seat 11 for recognition of the occupancy of the seat and a possibly present seat heater are connected to the onboard power network of the vehicle via a common cable harness 13 and a plug connector 14 which terminates this cable harness 13.

The floor covering 9 extends with one edge 15 past the floor portion 8. The edge 15 covers the adhesive channel 5 in each case. A closing strip 16 connects the edge 15 with the floor cover 9 to the parts of the load-bearing structure.

The seat module 7 is preassembled outside of the vehicle so that there is good accessibility to its individual components. As a result the assembly time can be reduced compared to assembly in the vehicle. The preassembled seat module 7 can now be tested outside of the vehicle for the correct functioning of all seat elements.

The complete preassembled and tested seat module 7 is inserted through the door opening 4, or from above in the case of an open roof, onto the load-bearing structure of the body 1. For this purpose the adhesive channels 5 are provided in advance with adhesive in which the supporting edges 6 of the floor portion 8 are immersed. In this case centering elements 17 in the form of nubs or spring-loaded pegs 18 are arranged in the supporting edges 6 which center the seat module 7 relative to the load-bearing structure and support it during the curing of the adhesive. The centering elements 17 in this case can engage pegs in a form-fitting manner in openings 18 of the load-bearing structure. The electrical connection of the seat 11 to the vehicle power network is accomplished by plugging in and locking the plug 14 in a corresponding socket inside the body.

After the curing of the adhesive in the adhesive channels 5, the floor portion 8 of the seat module 7 is an integral component of the load-bearing structure and therefore reinforces the stiffness of the body 1. The seat 11 can be detached later despite this by loosening the seat fixation means, e.g., screws 19, from the floor portion 8 and thus disassembled. The configuration of the seat module 7, as FIG. 7 shows, may in each case be designed for only one seat 11, as FIGS. 8 and 9 show, or also for two seats 11, in which case the seats may be positioned side by side (FIG. 8) or one behind the other (FIG. 9).

What is claimed is:

1. A body of a motor vehicle with at least one seat module, characterized in that the seat module (7) includes a floor portion (8), at least one seat (11), the seat adjusting elements, the seat covering portions, the electrical wires (13) connected to the seat (11) and a floor covering (9) and is preassembled outside the body (1), the floor portion (8) comprises at its periphery supporting edges (6) which are supported in adhesive-filled adhesive channels (5) on the load-bearing composite structure of the body (1), wherein the seat module (7) as a prefabricated unit is inserted in the load-bearing composite structure of the body (1) in such a way that the floor portion (8) forms in the region of the seat module (7) a double floor with the vehicle floor (4) of the body (1).

2. The body according to claim 1, characterized in that the floor covering (9) located on the seat module (7) extends over the outer periphery of the floor portion (8) and covers the adhesive channels (5) which support the seat module (7).

3. The body according to claim 2, characterized in that in the adhesive channels (5) and on the supporting edges (6) are provided centering elements which position and fix the supporting edge (6) in the adhesive channel (5) during hardening of the adhesive located in the adhesive channel (5) after insertion.

4. The body according to claim 1, characterized in that the electrical wires (13) of the seat module (7) are passed to a common connector (14).

5. The body according to claim 1, characterized in that the seat (11) is releasably attached to the floor portion (8) of the seat module (7).

6. The body according to claim 1, characterized in that a seat module (7) is provided for each individual seat (11).

7. The body according to claim 1, characterized in that a common seat module (7) is provided for the seats (11) of a row of seats.

8. The body according to claim 1, characterized in that a seat module (7) is provided for at least two seats (11) arranged one behind the other.

* * * * *